(12) United States Patent
Uruta et al.

(10) Patent No.: US 8,300,248 B2
(45) Date of Patent: Oct. 30, 2012

(54) PRINTING CONTROL SYSTEM WITH SUSPEND MODES AND METHOD THEREOF

(75) Inventors: Hiroya Uruta, Tokyo (JP); Toshio Kitazawa, Ichikawa (JP); Tsuyoshi Sakuma, Yokohama (JP); Yuka Saito, Kemakura (JP)

(73) Assignee: Ricoh Company, Limited, Tokyo (JP)

( * ) Notice: Subject to any disclaimer, the term of this patent is extended or adjusted under 35 U.S.C. 154(b) by 1246 days.

(21) Appl. No.: 12/022,527

(22) Filed: Jan. 30, 2008

(65) Prior Publication Data
US 2008/0180743 A1    Jul. 31, 2008

(30) Foreign Application Priority Data

Jan. 30, 2007   (JP) ................... 2007-019480
Sep. 28, 2007   (JP) ................... 2007-254558
Oct. 17, 2007   (JP) ................... 2007-270527

(51) Int. Cl.
*G06F 3/12* (2006.01)
(52) U.S. Cl. .............. 358/1.15; 358/1.13; 358/1.14; 358/1.11; 399/81; 399/77; 399/85
(58) Field of Classification Search ............. 358/1.15, 358/1.13, 1.14; 399/81, 77, 85
See application file for complete search history.

(56) References Cited

U.S. PATENT DOCUMENTS

| | | | | |
|---|---|---|---|---|
| 5,218,670 A | * | 6/1993 | Sodek et al. | 358/1.16 |
| 6,137,588 A | * | 10/2000 | Deen et al. | 358/1.15 |
| 6,785,727 B1 | * | 8/2004 | Yamazaki | 709/229 |
| 2004/0145776 A1 | * | 7/2004 | Azami | 358/1.15 |
| 2005/0052679 A1 | * | 3/2005 | Green et al. | 358/1.14 |
| 2006/0193017 A1 | * | 8/2006 | Zuber | 358/504 |
| 2006/0274351 A1 | * | 12/2006 | Daos et al. | 358/1.14 |

FOREIGN PATENT DOCUMENTS

| | | |
|---|---|---|
| JP | 11-78170 | 3/1999 |
| JP | 2000-062292 | 2/2000 |
| JP | 2002-262003 | 9/2002 |
| JP | 2005-182396 | 7/2005 |
| JP | 2006-103236 | 4/2006 |

OTHER PUBLICATIONS

Japanese Office Action issued Nov. 29, 2011, in Patent Application No. 2007-270527.

* cited by examiner

*Primary Examiner* — Benny Q Tieu
*Assistant Examiner* — Paul F Payer
(74) *Attorney, Agent, or Firm* — Oblon, Spivak, McClelland, Maier & Neustadt, L.L.P.

(57) ABSTRACT

A printing control system includes a host interface, a user interface, a printing unit, and a controller. The host interface communicates with a host device that submits a print job. The user interface communicates with a user. The printing unit executes the print job. The controller suspends operation at the printing unit in response to a suspend request received at one of the host interface and user interface. The controller measures an elapsed time since the suspension, and transmits one of first and second commands upon determining that the elapsed time exceeds a given reference time. The first command causes the printing unit to automatically resume the suspended operation. The second command causes the host interface to send a notification of the suspension.

12 Claims, 16 Drawing Sheets

FIG. 9

| SUSPEND NOTIFICATION | | | |
|---|---|---|---|
| | NOTIFICATION RECIPIENT | | |
| | | ADMINISTRATOR | |
| | | JOB OWNER(S) OF: | |
| | | | CURRENT JOB |
| | | | ALL JOBS |
| | NOTIFICATION DELIVERY METHOD | | |
| | | SEND E-MAIL | |
| | | NOTIFY HOST | | ed
PRINTING CONTROL SYSTEM WITH SUSPEND MODES AND METHOD THEREOF

CROSS-REFERENCE TO RELATED APPLICATIONS

The present patent application claims priority under 35 U.S.C. §119 from Japanese Patent Application Nos. 2007-019480 filed on Jan. 30, 2007, 2007-254558 filed on Sep. 28, 2007, and 2007-270527 filed on Oct. 17, 2007 in the Japanese Patent Office, the contents of each of which are hereby incorporated by reference herein in their entirety.

BACKGROUND OF THE INVENTION

1. Field of the Invention

The present invention relates to a printing control system and method, and more particularly, to a printing control system and method for controlling a printing process with enhanced operability and efficiency.

2. Discussion of the Background

As printing systems are prevalently used in a network environment, situations have become prevalent wherein a single printer handles multiple print jobs transmitted from different host devices such as personal computers (PCs) that share the printing capability over a network.

In a network printing system, multiple print jobs received at a printer are typically added to a print queue to be sequentially executed in the queue order. The printer may interrupt a running job when an error occurs, e.g., no paper or wrong size paper is loaded in a selected paper tray, or when a user issues a suspend request, e.g., for canceling a job submitted with settings that are not intended. This may delay subsequent jobs queued behind the interrupted one, reducing throughput and usability of the system as the delayed jobs typically remain suspended or pending unless the error is remedied the user submits a resume request.

Various printing methods have been proposed to address such a problem. One conventional technique provides a printing system in which a printer is able to execute pending print jobs prior to a preceding one that is interrupted due to an error. This printing system may automatically suspend pending jobs upon occurrence of an error, and where possible, resume the suspended jobs when the error is not remedied in a given time period.

Another conventional technique provides an image forming apparatus that can efficiently resume suspended print jobs by canceling a preceding job that is interrupted due to an error. In resuming printing after the error is removed, the image forming apparatus clears image data of an interrupted job without receiving a resume request, which allows swift processing of suspended jobs queued behind the cancelled one.

Both of these conventional techniques are designed for resuming a process suspended due to an error, and do not address a problem that may occur when a printing process is suspended by a user in the absence of an error. Typically, a printing process suspended according to a user-submitted suspend request cannot be resumed without a user-submitted resume request. When the user inadvertently fails to send such a resume request, this may cause the printing process to remain interrupted and thus delay processing of print jobs queued behind the interrupted one.

Therefore, there is a need for a printing system in which a suspension function is implemented with better efficiency and enhanced operability, which may be especially effective when used in a network environment.

SUMMARY OF THE INVENTION

Exemplary aspects of the present invention are made in view of the above-described circumstances, and provide a novel printing control system capable of controlling a printing process with enhanced operability and efficiency.

Other exemplary aspects of the present invention provide a novel printing control method capable of controlling a printing process with enhanced operability and efficiency.

In one exemplary embodiment, the novel printing control system includes a host interface, a user interface, a printing unit, and a controller.

The host interface is configured to communicate with a host device that submits a print job. The user interface is configured to communicate with a user. The printing unit is configured to execute the print job. The controller is configured to suspend operation at the printing unit in response to a suspend request received at one of the host interface and the user interfaces, to measure an elapsed time since the suspension, and to transmit one of first and second commands upon determining that the elapsed time exceeds a given reference time. The first command causes the printing unit to automatically resume the suspended operation. The second command causes the host interface to send a notification of the suspension to the user.

In one exemplary embodiment, the novel printing control method includes the steps of receipt, initiation, suspension, measurement, and performing one of resumption and notification. The reception step receives a print job from a host device. The initiation step initiates a printing unit to process the print job. The suspension step suspends operation of the printing unit after initiation in the initiation step in response to a suspend request. The measurement step measures an elapsed time since the suspension. The resumption step causes the printing unit to automatically resume the suspended operation upon determining that the elapsed time exceeds a given reference time. The notification step sends a notification of the suspension upon determining that the elapsed time exceeds a given reference time.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 is a schematic diagram illustrating settings for the notification capability performed through the user interface;

DETAILED DESCRIPTION OF PREFERRED EMBODIMENTS

Figure 1:
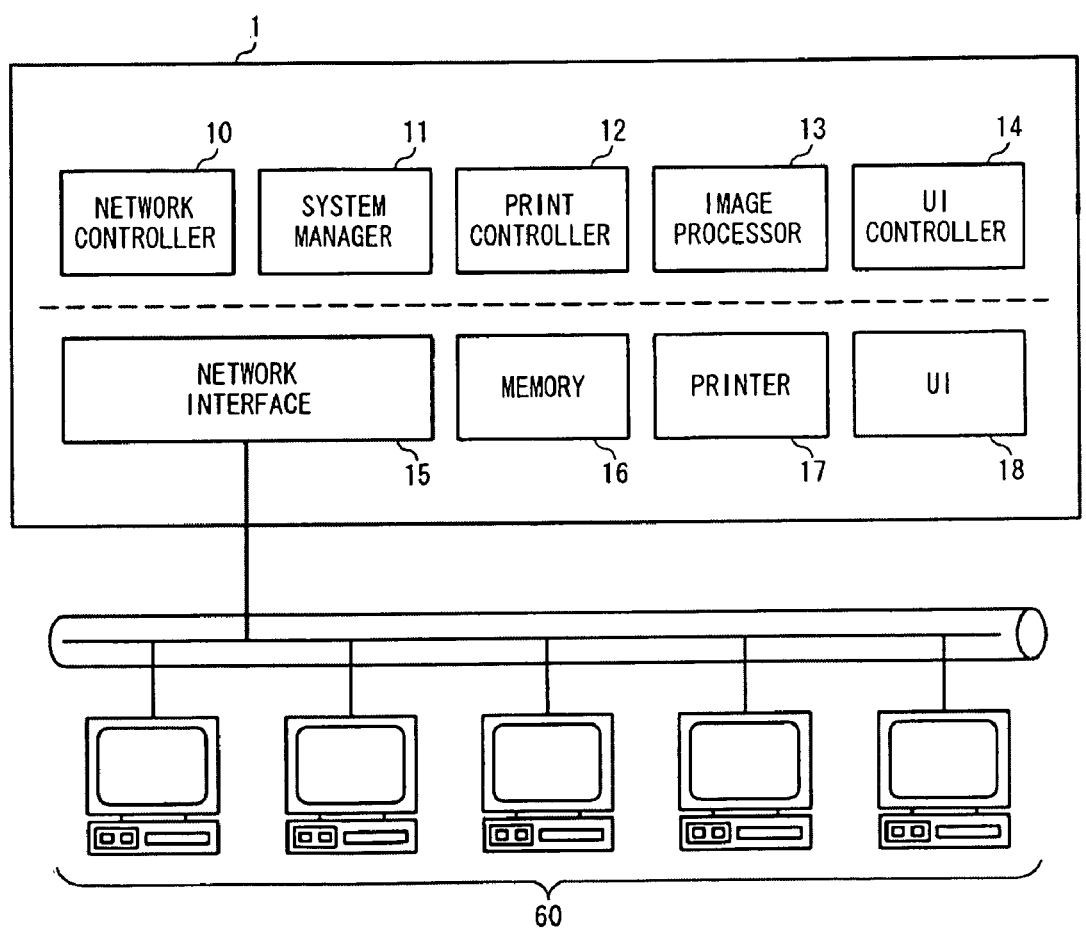
FIG. 1 is a schematic diagram illustrating a printing system in a network environment according to at least one example embodiment of this patent specification.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

Referring now to the drawings, wherein like reference numerals designate identical or corresponding parts throughout the several views, example embodiments of the present patent application are described.

Referring to FIG. 1 of the drawings, a schematic diagram illustrating a printing system 1 in a network environment according to at least one example embodiment of this patent specification is described.

As shown in FIG. 1, the printing system 1 includes a network controller 10, a system manager 11, a print controller 12, an image processor 13, a user interface (UI) controller 14, a network interface 15, a memory 16, a printer 17, and a user interface (UI) 18. The printing system 1 is connected through a network to one or more host computers 60 that transmit print jobs.

In the printing system 1, the system manager 11 controls operation of system components by sending various requests and/or commands to the network controller 10, the print controller 12, the image processor 13, and the UI controller 14, respectively.

The network controller 10 communicates with the host computers 60 through the network interface 15 to transmit information and/or receive print jobs over the network. The network communication is based on suitable protocols, such as simple network management protocol (SNMP) and simple mail transfer protocol (SMTP).

The image processor 13 serves to convert a print job to a format compatible with the printer 17, and stores the converted data in the memory 16 for later retrieval by the printer 17.

The print controller 12 serves to control the printer 17 to sequentially retrieve respective print jobs from the memory 16 and execute printing under the control of the system manager 11.

The UI controller 14 serves to perform communication with a user through input and output via the UI 18, storing input data (e.g., user-specified settings) in the memory 16 and displaying output data (e.g., messages or instructions for user operation) retrieved from the memory 16.

The memory 16 may be any type of data storage, such as a non-volatile random access memory (NVRAM), a read only memory (ROM), or a hard disk drive (HDD).

Figure 2:
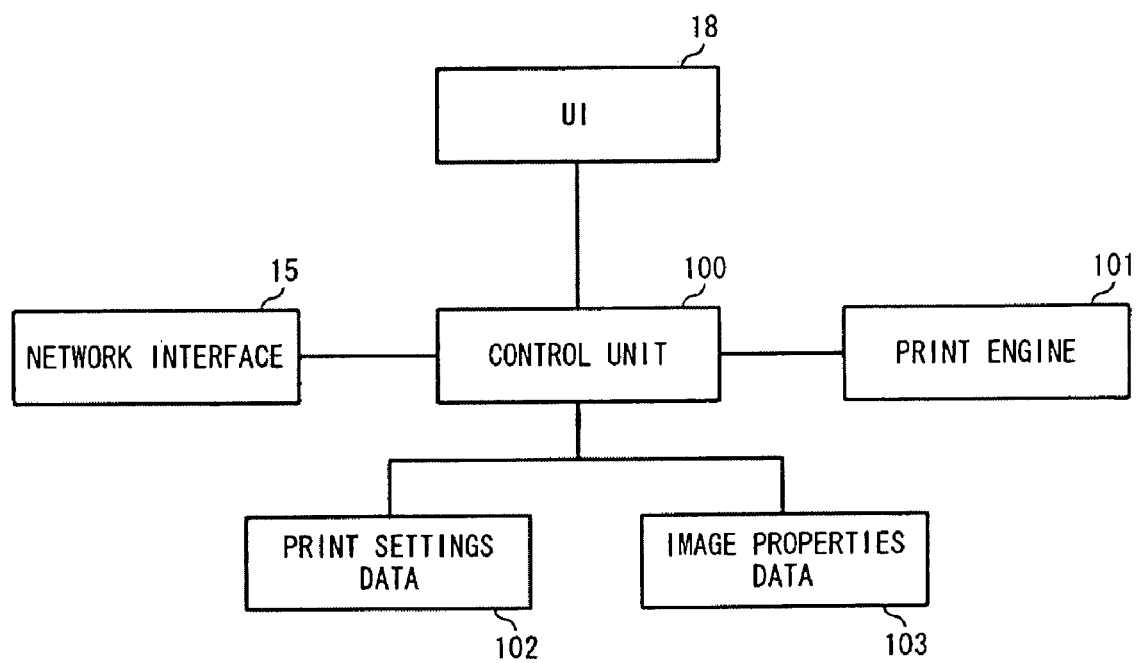
FIG. 2 is a block diagram illustrating how the printing system of FIG. 1 handles a print job.

Referring now to FIG. 2, a block diagram illustrating how the printing system 1 handles a print job is described.

In FIG. 2, the printing system 1 has a control unit 100 and a print engine 101 connected thereto. The control unit 100 is incorporated in the system manager 11, and the print engine 101 is incorporated in the printer 17. The control unit 100 may access print settings data 102 and image properties data 103, which are stored in the memory 16. The control unit 100 is also connected to the network interface 15 and the UI 18.

During operation, the control unit 100 receives a print job with user-specified information from the network interface 15, and stores the received information as the print settings data 102 and the image properties data 103. In handling a print job, the control unit 100 generates image data according to the image properties data 103 (hereinafter referred to as "image processing"), and submits a print request to the print engine 101 for printing the image data according to the print settings data 102 (hereinafter referred to as "printing").

Further, the printing system 1 has a suspension function, in which the control unit 100 suspends only printing (hereinafter referred to as "suspend mode M1) or both printing and image processing (hereinafter referred to as "suspend mode M2") in response to a user-submitted suspend request so that the printing system 1 enters a suspended state. The control unit 100 also resumes a suspended process in response to a user-submitted resume request so that the printing system returns to a non-suspended state. Submitting suspend and resume requests to the printing system 1 may be performed by manipulation on the UI 18 and/or through transmission from the network interface 15.

Figure 3:
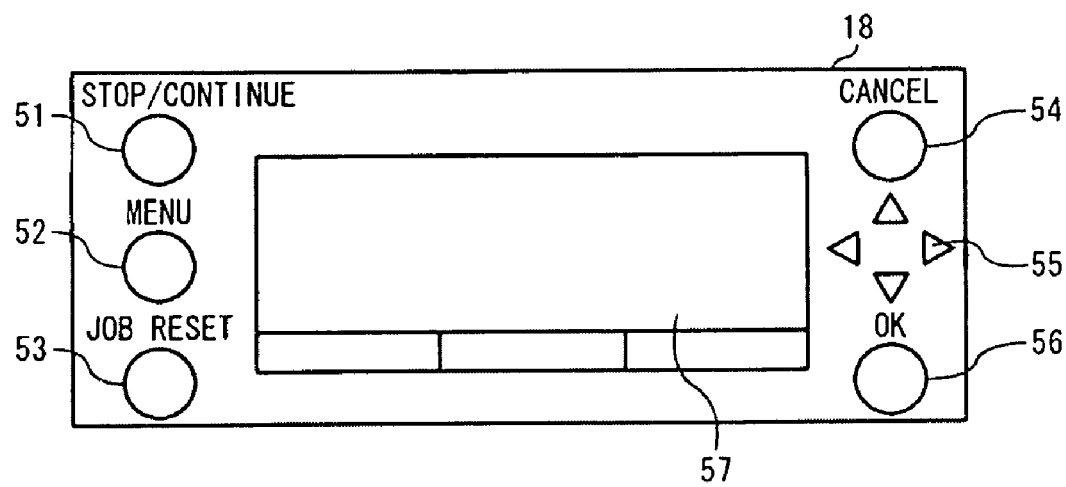
FIG. 3 is a schematic diagram illustrating an example of a user interface included in the printing system of FIG. 1.

Referring now to FIG. 3, a schematic diagram illustrating an example of the UI 18 is described.

As shown in FIG. 2, the UI 18 has a display panel 57 and multiple control keys, including a STOP/CONTINUE key 51, a MENU key 52, a JOB RESET key 53, a CANCEL key 54, scroll keys 55, and an OK key 56. These control keys allow the user to input information, select items, and/or submit requests on the display panel 57.

Although in the following portions of this patent specification the term "press" is predominantly used with regard to manipulation of the display panel 57, such manipulation may be performed by any suitable action taken by the user, including depressing or touching a particular control key.

In the UI 18, the STOP/CONTINUE key 51 is used to submit suspend and resume requests from the UI 18. Specifically, pressing the STOP/CONTINUE key 51 in a non-suspended state transmits a suspend request to the printing system 1. Pressing the STOP/CONTINUE key 51 in a suspended state transmits a resume request to the printing system 1.

Further, the STOP/CONTINUE key 51 has a light-emitting diode (LED) to indicate status of the printing system 1. For example, while in a suspended state, the UI controller 14 may control the UI 18 to drive the LED to emit light of a specific color such as yellow, allowing the user to ascertain the operating status of the printing system 1.

The MENU key 52 is used to display a hierarchical list of menu items for user selection on the display panel 57.

The JOB RESET key 53 is used to cancel an already-submitted print job that is suspended or pending in a suspended state.

The scroll keys 55 are used to scroll a cursor for selecting one item from multiple displayed items, e.g., selecting a particular menu item on the display panel 57.

The CANCEL key 54 and the OK key 56 are respectively used to cancel or confirm selection of an item on the display panel 57.

With the UI 18 as described above, the user may submit suspend and resume requests to the printing system 1 using the STOP/CONTINUE key 51 and/or through selecting items on the display panel 57 using the scroll keys 55 and the OK key 56.

Referring to FIGS. 4A through 4D, schematic diagrams illustrating the UI 18 with the display panel 57 in different states of the printing system 1 are described.

As shown in FIGS. 4A through 4D, the UI 18 changes information on the display panel 57 as the printing system 1 changes operation status upon initiating or completing a print job, or upon receiving a suspend request or a resume request submitted by the user.

Figure 4B:
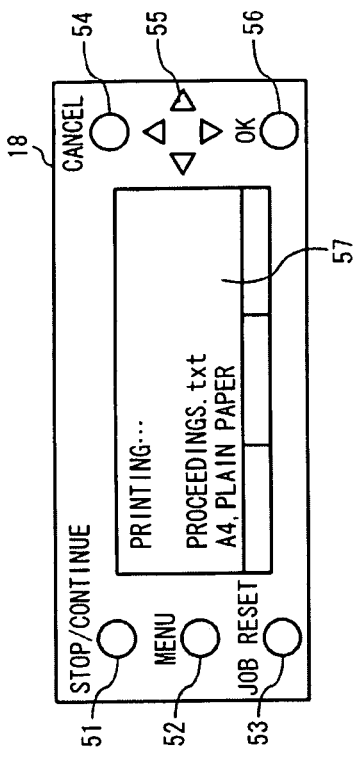
FIGS. 4A through 4D are schematic diagrams illustrating the user interface with a display panel in different states of the printing system of FIG. 1.
Figure 4D:
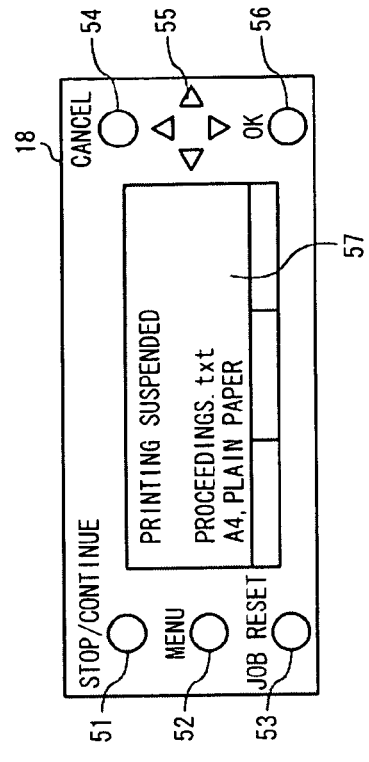
Figure 4A:
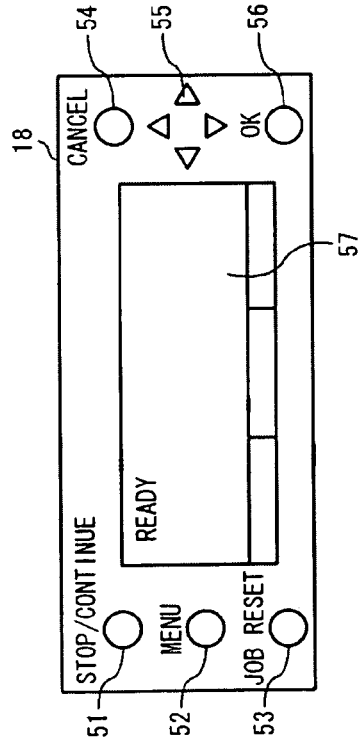

For example, when the printing system 1 has no print job in a non-suspended state, the display panel 57 displays a message as shown in FIG. 4A. The message indicates that the printing system 1 is in a condition for processing a print job ("READY").

When the printing system 1 has a print job in a non-suspended state, the display panel 57 displays a message with features of the print job as shown in FIG. 4B. The message indicates that printing is in progress and identifies the print job being processed ("PRINTING . . . " and "PROCEEDINGS. txt, A4, PLAIN PAPER").

Figure 4C:
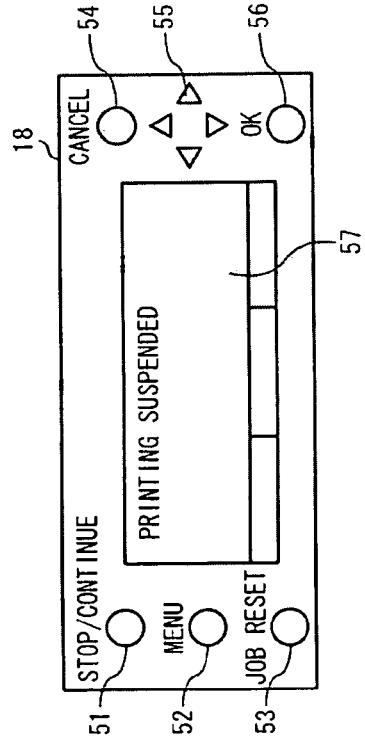

When the printing system 1 has no print job in a suspended state, the display panel 57 displays a message as shown in FIG. 4C. The message indicates that the printing system 1 is not in a condition for processing a print job ("PRINTING SUSPENDED").

When the printing system 1 has a print job in a suspended state, the display panel 57 displays a message with features of the print job as shown in FIG. 4D. The message indicates that printing is suspended and identifies the print job being suspended ("PRINTING SUSPENDED" and "PROCEEDINGS. txt, A4, PLAIN PAPER").

Figure 5:
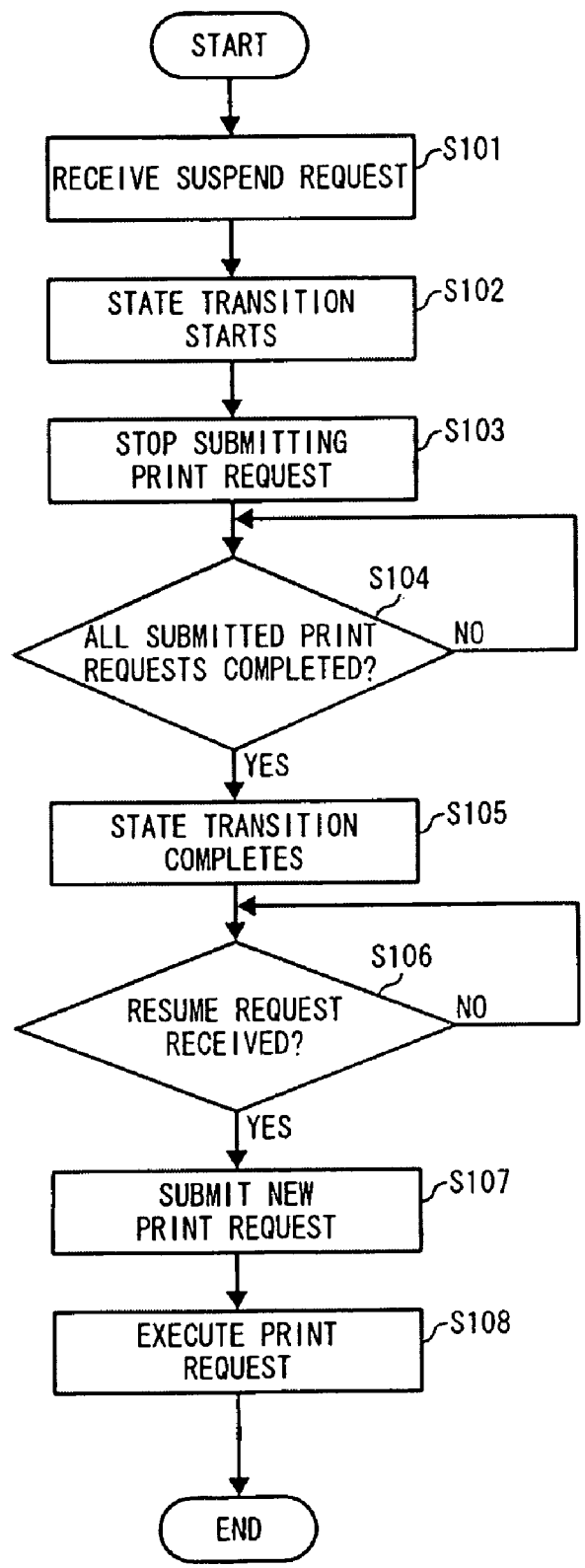
FIG. 5 is a flowchart illustrating how the printing system of FIG. 1 operates in response to suspend and resume requests submitted by a user.

Referring to FIG. 5, a flowchart illustrating how the printing system 1 operates in response to suspend and resume requests submitted by the user is described, where the suspension function suspends only the printing process (i.e., operation in the suspend mode M1).

During operation, the printing system 1 receives a suspend request submitted by the user in a non-suspended state (S101). In response to the suspend request, the printing system 1 initiates a state transition (S102), wherein the control unit 100 stops submitting a print request to the print engine 101 so that print jobs remain pending after image processing (S103).

Then, the control unit 100 determines whether or not the print engine 101 completes print requests that have been submitted (S104). When all the print requests are complete, the printing system 1 is in a suspended state (S105).

In the suspended state, the printing system 1 waits for a resume request (S106). Upon receiving a resume request, the control unit 110 may resume submitting a print request to the print engine 101 (S107), i.e., the system manager 11 notifies the print controller 12 to activate the printer 17, so that the print engine 101 can process a pending print job (S108).

As shown in FIG. 5, the printing system 1 can continue data communication with the host computers 60 and/or image processing of received data while entering a suspended state in the suspend mode M1. This enables system components of the printing system 1 to work efficiently, achieving faster operation and enhanced productivity.

In describing embodiments of this patent specification, the following portions mainly consider the suspension function in the context of its performance in the suspend mode M1 unless otherwise noted. However, with appropriate configurations, the following embodiments may also be implemented in a substantially identical manner when the suspension is performed in the suspend mode M2 as well.

In one embodiment, the printing system 1 may have an auto-resume capability that allows the print engine 101 to automatically resume printing when printing remains suspended for a given time period.

Figure 6:
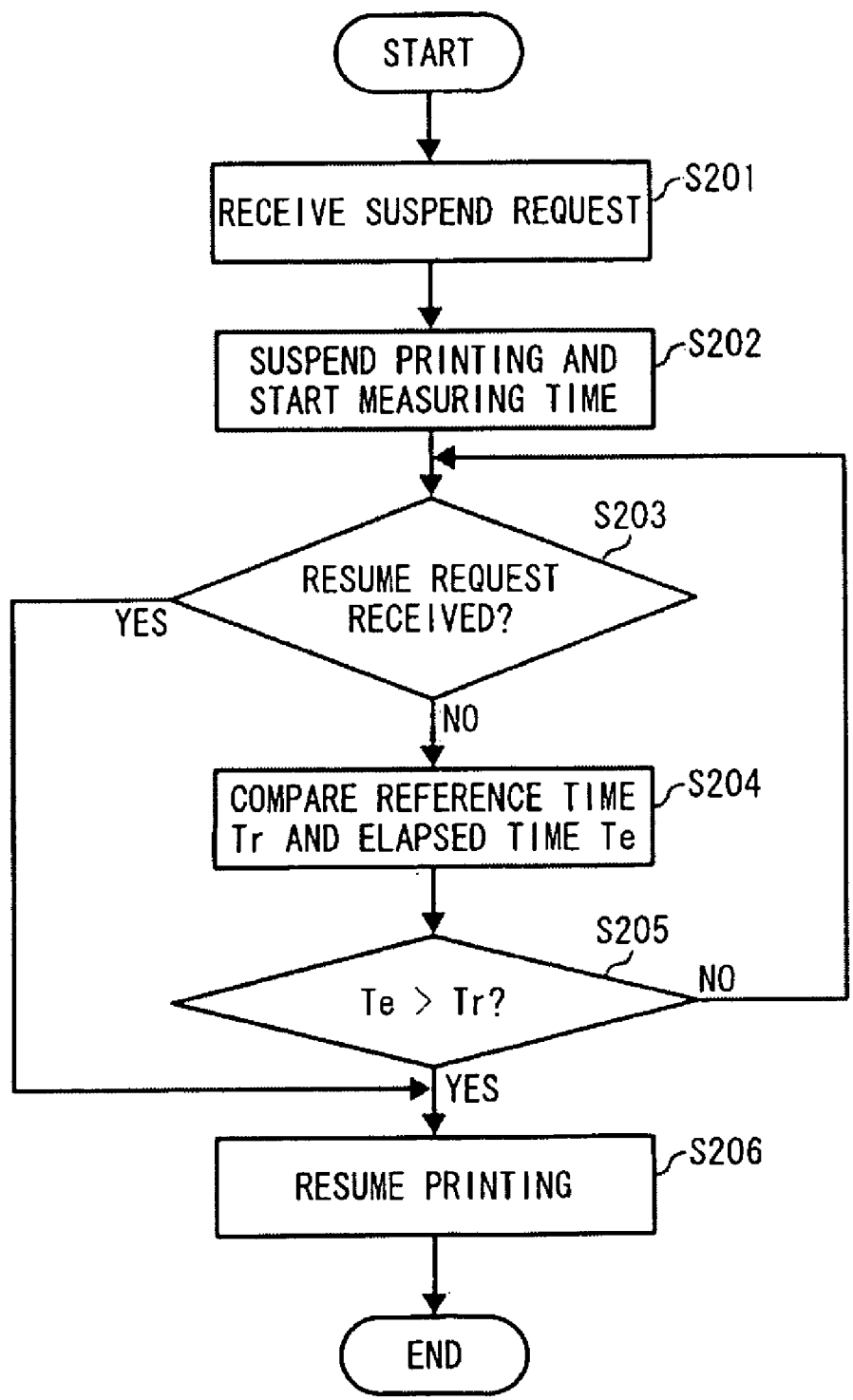
FIG. 6 is a flowchart illustrating operation of the printing system of FIG. 1 provided with an auto-resume capability.

Referring to FIG. 6, a flowchart illustrating operation of the printing system 1 with the auto-resume capability is described.

During operation, the printing system 1 receives a suspend request submitted by the user in a non-suspended state (S201). In response to the suspend request, the printing system 1 enters a suspended state while the system manager 11 starts measuring time (S202).

When a resume request is not received ("NO" in S203), the system manager 11 retrieves a reference time $T_r$ and an elapsed time $T_e$, and compares the reference time $T_r$ with the elapsed time $T_e$ (S204). The elapsed time $T_e$ refers to a measured amount of time elapsed since receiving the suspend request. The reference time $T_r$ refers to a given reference time set by default in the memory 16, and may be modified by the user.

As long as the elapsed time $T_e$ does not exceed the reference time $T_r$ ("NO" in S205), the printing system 1 continues to wait for a resume request (S203).

When the elapsed time $T_e$ exceeds the reference time $T_r$ ("YES" in S205), or upon receiving a resume request ("YES" in S203), the printing system 1 resumes printing or becomes ready for printing (S206).

In the embodiment as illustrated in FIG. 6, the reference time $T_r$ may be specified by the user through the UI 18, and is stored in RAM of the memory 16 for retrieval by the system manager 11. The setting of the reference time $T_r$ using the UI 18 may be performed before printing is executed and/or while printing is suspended.

Figure 7A:
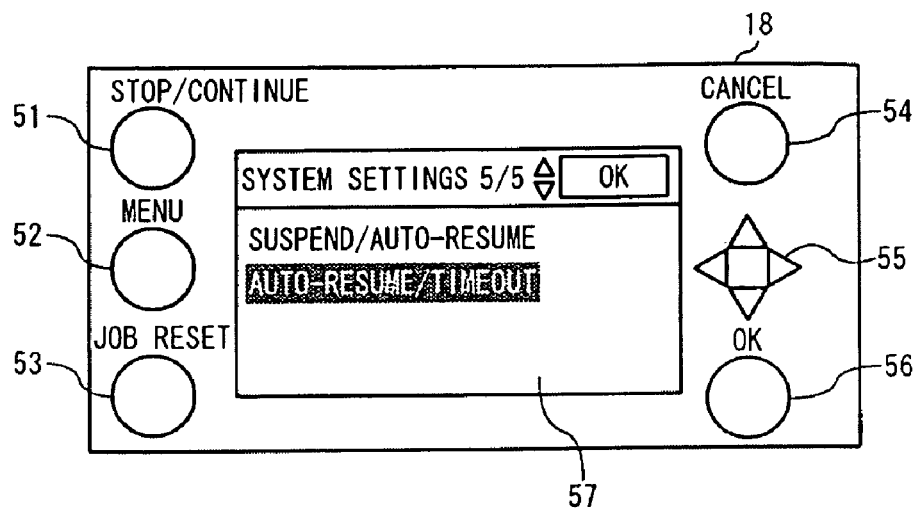
FIGS. 7A and 7B are schematic diagrams illustrating setting a reference time using through the user interface.
Figure 7B:
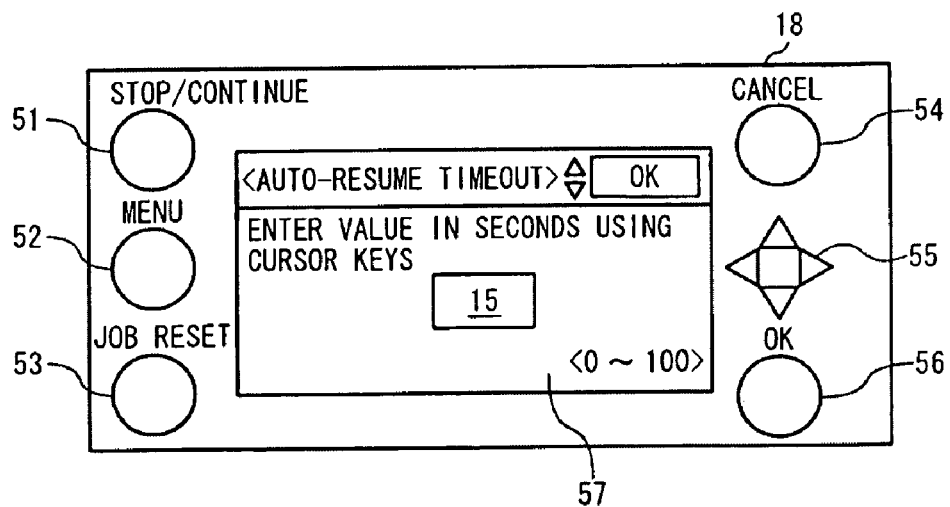

Referring to FIGS. 7A and 7B, schematic diagrams illustrating the setting of the reference time $T_r$ performed through the UI 18 are described.

In response to a given user action on the UI 18, the UI 18 displays a list of options for system settings on the display panel 57 ("SYSTEM SETTINGS") as shown in FIG. 7A. The options list includes options related to suspend and auto-resume capabilities, where a selected item ("AUTO-RESUME TIMEOUT") is highlighted or displayed with foreground and background colors reversed.

When the user selects "AUTO-RESUME TIMEOUT" from the options list and presses the OK key 56, the UI 18 displays an entry screen for specifying the reference time $T_r$ on the display panel 57 as shown in FIG. 7B. In the entry screen, the user can select a desired value ranging from 0 to 100 (seconds), such as 15 seconds, using the up and down scroll keys 55. When a selected value is entered, pressing the OK key 56 informs the UI controller 14 of the data entry, so that the system manager 11 stores the input data as the reference time Tr in the memory 16.

Alternatively, the printing system 1 may have a notification capability that notifies the user and/or an administrator of the printing system 1 when printing remains suspended for a given time period.

Figure 8:
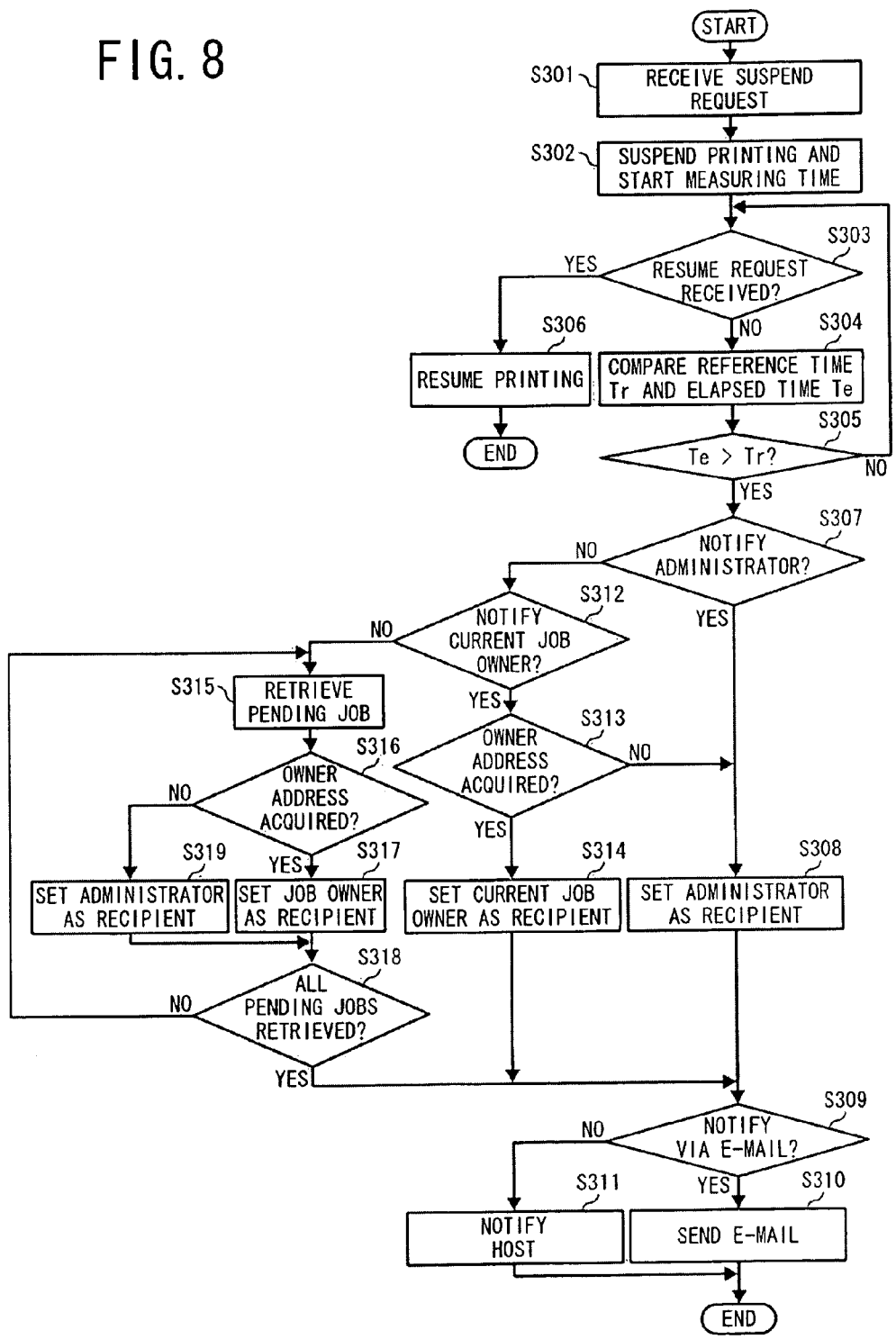
FIG. 8 is a flowchart illustrating operation of the printing system of FIG. 1 provided with a notification capability.

Referring to FIG. 8, a flowchart illustrating operation of the printing system 1 with the notification capability is described.

Upon receiving a suspend request submitted by the user in a non-suspended state, the printing system 1 suspends printing, and operates in a substantially identical manner as illustrated in S201 through S204, and S206 of FIG. 6 (S301 through S304, and S306).

While the elapsed time Te does not exceed the reference time Tr ("NO" in S305), the printing system 1 continues to wait for a resume request (S303). When the elapsed time Te exceeds the reference time Tr ("YES" in S305), the system manager 11 accesses the memory 16 to check a specified recipient to which a notification is to be delivered (hereinafter referred to as "notification recipient").

When the administrator of the printing system 1 is selected as the notification recipient ("YES" in S307), the system manager 11 retrieves administrator information from the memory 16, such as e-mail address and/or internet protocol (IP) address, and sets the administrator as the notification recipient (S308).

When the administrator is not selected as the notification recipient ("NO" in S307), the system manager 11 accesses the memory 16 to determine a job owner to which a notification is to be delivered.

When a current job owner, i.e., the submitter of a specific print job that is the first one to be processed when printing is resumed, is selected as the notification recipient ("YES" in step S312), the system manager 11 attempts to acquire owner information included in the current job, such as e-mail address and/or IP address of the submitter.

Upon acquiring owner information of the current job ("YES" in S313), the system manager 11 sets the current job owner as the notification recipient (S314). When failing to acquire owner information of the current job ("NO" in S313), the system manager 11 retrieves administrator information from the memory 16 and sets the administrator as the notification recipient (S308).

When the current job owner is not set as the notification recipient ("NO" in step S312), the system manager 11 retrieves a print job that is pending after image processing (S315), and attempts to acquire owner information included in the retrieved job, such as e-mail address and/or IP address of the submitter.

Upon acquiring owner information ("YES" in S316), the system manager 11 sets the retrieved job owner as the notification recipient (S317). When failing to acquire owner information ("NO" in S316), the system manager 11 retrieves administrator information from the memory 16 and sets the administrator as the notification recipient (S319). Thus, the system manager 11 retrieves all the pending print jobs to complete the setting of notification recipients (S318).

When the setting of notification recipient(s) is completed, the system manager 11 accesses the memory 16 to check a specified method by which notification is to be delivered (hereinafter referred to as "notification method").

When the notification method is specified as sending an e-mail ("YES" in S309), the network controller 10 delivers a suspend notification by sending an e-mail. When the notification method is specified as notifying a host device ("NO" in S309), the network controller 10 delivers the suspend notification via SNMP communication.

In the embodiment as illustrated in FIG. 8, the reference time Tr may be specified by the user through the UI 18 in a manner similar to that illustrated in FIGS. 7A and 7B, and is stored in RAM of the memory 16 for retrieval by the system manager 11. The setting of the reference time Tr using the UI 18 may be performed before printing is executed and/or while printing is suspended.

Further, settings for the notification capability including the notification recipient and the notification method may be specified by the user, and are stored in RAM of the memory 16 for retrieval by the system manager 11.

Referring to FIG. 9, a schematic diagram illustrating settings for the notification capability of the printing system 1 performed through the UI 18 is described.

In response to a given user action, the UI 18 displays a hierarchical list of options for the notification capability on the display panel 57 as shown in FIG. 8 ("SUSPEND NOTIFICATION"). The options list includes a recipient option ("NOTIFICATION RECIPIENT") and a delivery method option ("NOTIFICATION DELIVERY METHOD").

The recipient option is used to specify the notification recipient. The notification recipient may be specified as either or both an administrator of the printing system 1 ("ADMINISTRATOR") and a job owner submitting a print job ("JOB OWNER(S) OF"). The type of job owner may be specified as a submitter of a current job or submitters of all print jobs pending after image processing ("CURRENT JOB" and "ALL JOBS").

The delivery method option is used to specify the notification method. The notification method may involve sending an e-mail to a specified user via SMTP ("SEND E-MAIL") or notifying a specified host device via SNMP ("NOTIFY HOST").

Alternatively, the printing system 1 may implement the notification capability using an error notification function incorporated in the printing system 1, whereby a suspended print process state of operation is reported as an error just like a paper jam or a lack of toner, thus allowing ready application of the notification capability without involving relatively complicated procedures.

Figure 10:
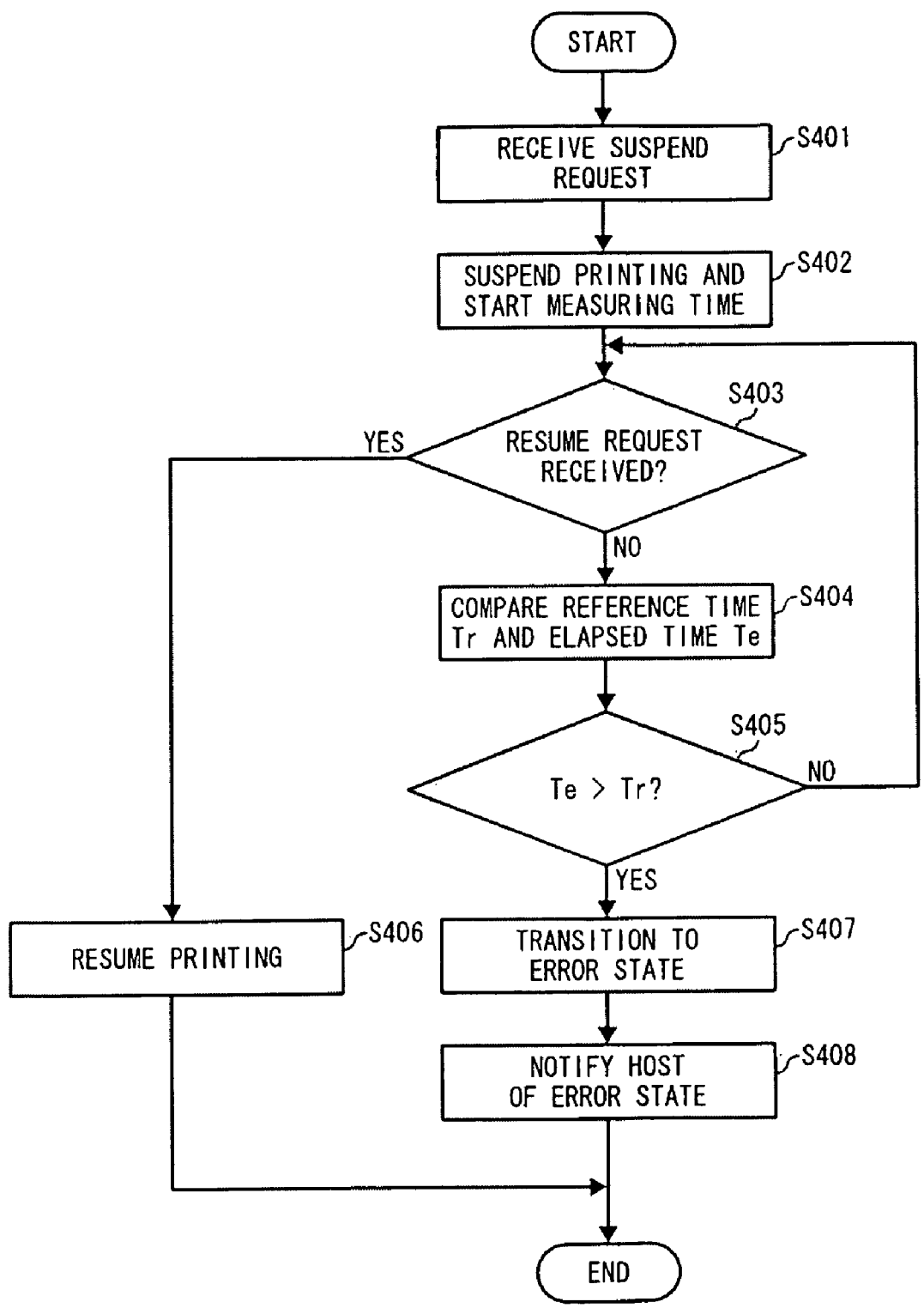
FIG. 10 is a flowchart illustrating operation of the printing system of FIG. 1 with the notification capability based on an error notification function.

Referring to FIG. 10, a flowchart illustrating operation of the printing system 1 with the notification capability based on an error notification function is described.

Upon receiving a suspend request submitted by a user in a non-suspended state, the printing system 1 suspends printing and operates in a manner substantially identical to that illustrated in S201 through S204, and S206 of FIG. 6 (S401 through S404, and S406).

As long as the elapsed time Te does not exceed the reference time Tr ("NO" in S405), the printing system 1 continues to wait for a resume request (S403). When the elapsed time Te exceeds the reference time Tr ("YES" in S405), the system manager 11 makes a transition to an error state (S407).

Upon the transition to an error state, the network controller 10 delivers an error notification via SNMP communication to a submitter host (S408). Alternatively, the UI controller 14 may display an error message on the UI 18 for notifying a user.

In the embodiment as illustrated in FIG. 10, the reference time Tr may be specified by a user through the UI 18 in a similar manner as illustrated in FIGS. 7A and 7B, and is stored in RAM of the memory 16 for retrieval by the system manager 11. The setting of the reference time Tr using the UI 18 may be performed before printing is executed and/or while printing is suspended.

In a further embodiment of this patent specification, the printing system 1 may have a countdown capability combined with one of the auto-resume and notification capabilities, which allows the user to know when the automatic resumption occurs or when the notification is delivered after printing remains suspended for a given time period.

Figure 11:
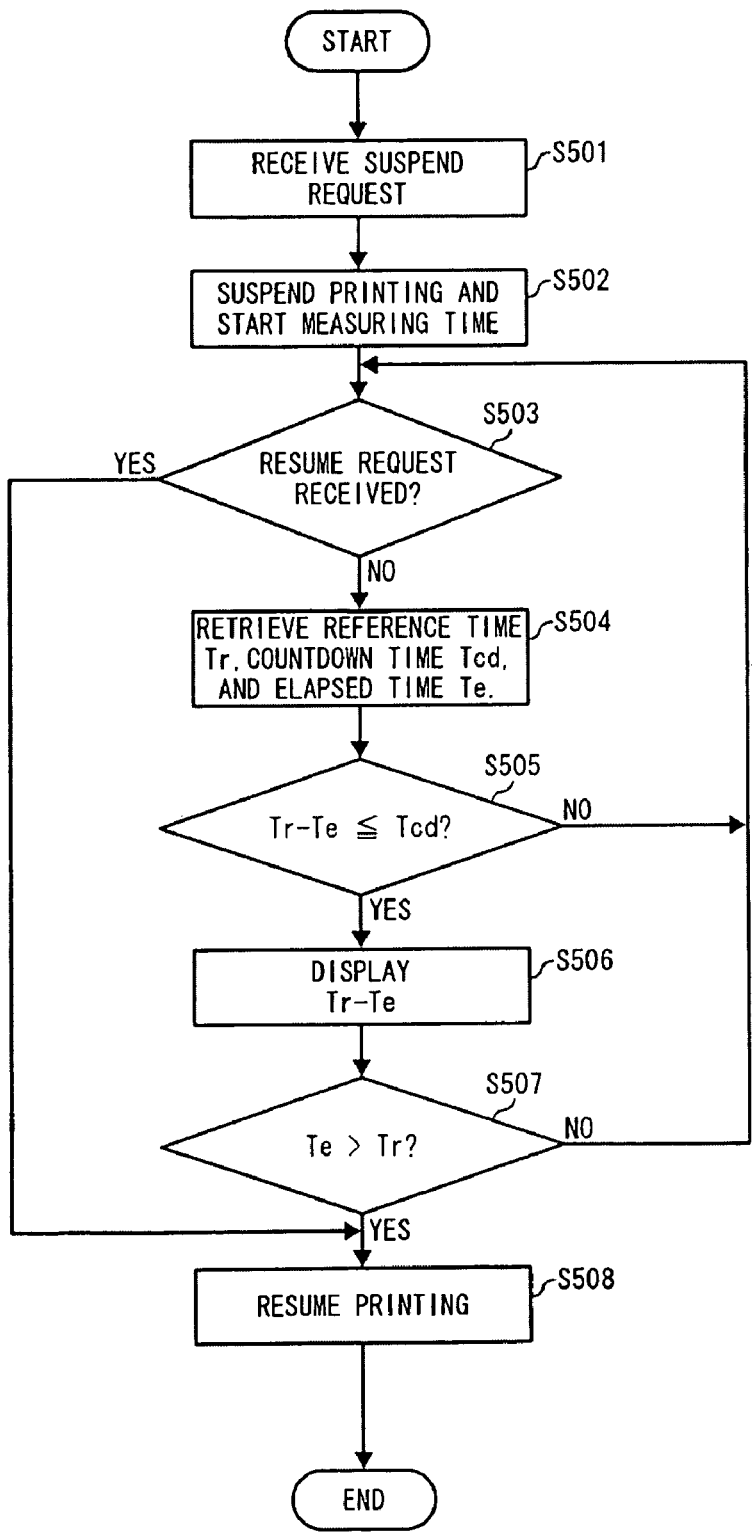
FIG. 11 is a flowchart illustrating operation of the printing system of FIG. 1 provided with a countdown capability combined with the auto-resume capability.

Referring now to FIG. 11, a flowchart illustrating operation of the printing system 1 with the countdown capability combined with the auto-resume capability is described.

During operation, the printing system 1 receives a suspend request submitted by the user in a non-suspended state (S501). In response to the suspend request, the printing system 1 enters a suspended state while the system manager 11 starts measuring time (S502).

Upon receiving a resume request ("YES" in S503), the printing system 1 resumes printing or becomes ready for printing (S508).

When a resume request is not received ("NO" in S503), the system manager 11 retrieves the reference time Tr, the elapsed time, and a countdown time Tcd. The countdown time Tcd refers to a reference time set by default in the memory 16, which can be modified by the user, for example, through the UI 18. The system manager 11 calculates a difference between Tr and Te, i.e., the amount of time remaining before the printing apparatus 1 automatically resumes printing (hereinafter referred to as "remaining time Tr-Te"), and compares the remaining time Tr-Te with the countdown time Tcd (S504).

As long as the remaining time Tr-Te exceeds the countdown time Tcd ("NO" in S505), the printing system 1 continues to wait for a resume request (S503).

When the remaining time Tr-Te is equal to or lower than the countdown time Tcd ("YES" in S505), the UI controller 14 displays the remaining time Tr-Te on the UI 18 (S506).

Thereafter, the system manager 11 compares the reference time Tr and the elapsed time Te. As long as the elapsed time Te does not exceed the reference time Tr ("NO" in S507), the printing system 1 continues to wait for a resume request (S503). When the elapsed time Te exceeds the reference time Tr ("YES" in S507), the printing system 1 resumes printing or becomes ready for printing (S508).

In the embodiment as illustrated in FIG. 11, the printing system 1 may indicate the remaining time Tr-Te through the UI 18 by any appropriate indicator means, including visual or audible representations.

Figure 12A:
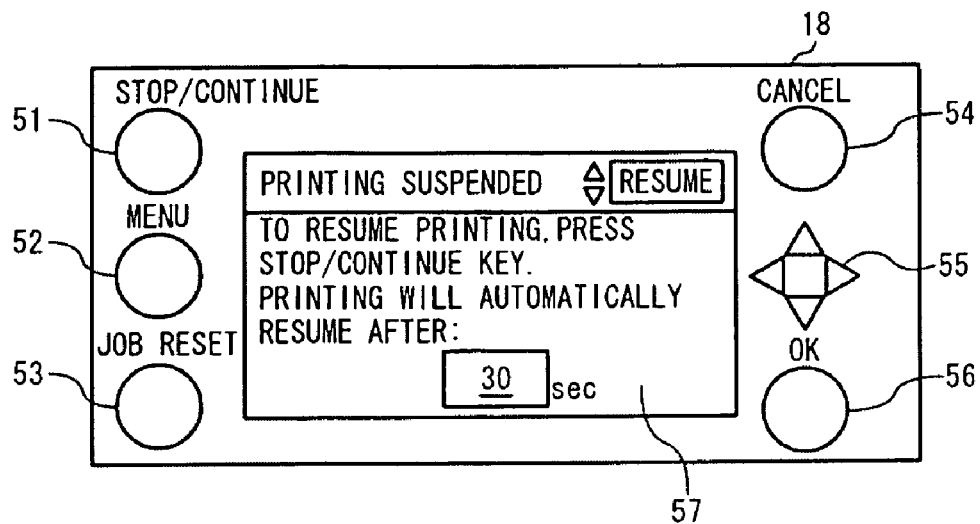
FIGS. 12A and 12B are schematic diagrams illustrating examples of display on the user interface for the countdown capability.
Figure 12B:
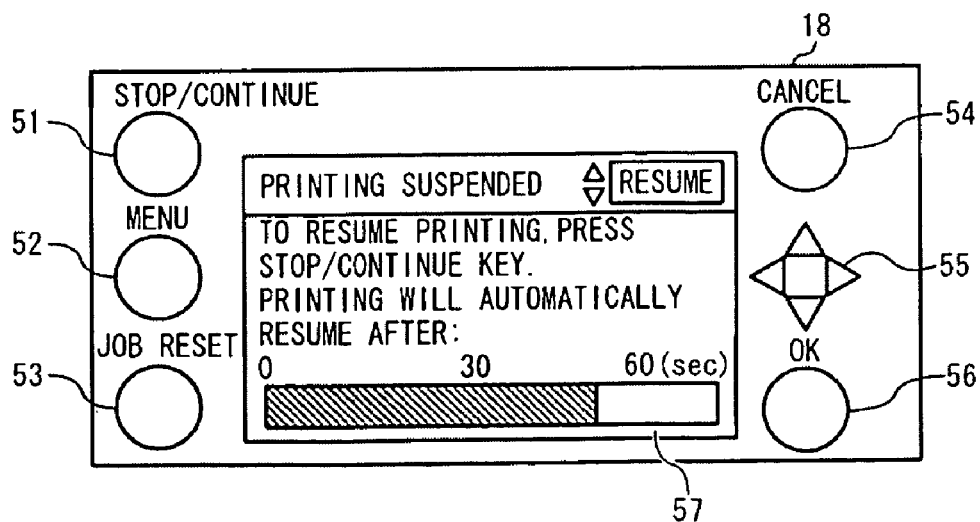

Referring now to FIGS. 12A and 12B, schematic diagrams illustrating examples of display on the UI 18 indicating the remaining time Tr-Te are described.

When the remaining time Tr-Te reaches the countdown time Tcd, the UI 18 provides a numeric countdown on the display panel 57 as shown in FIG. 12A, which counts down toward zero (e.g., 30, 29, 28, . . . ) as the remaining time Tr-Te decreases.

Alternatively, the UI 18 may graphically display a countdown timer on the display panel 57 as shown in FIG. 12B, which indicates the remaining time Tr-Te in a bar graph that is colored in proportion to the decreasing amount of time (e.g., three quarters of 60 seconds representing 45 seconds).

In a still further embodiment of this patent specification, the printing system 1 may have a job-modification capability. When used with the suspension capabilities described above, the job-modification capability allows a user to modify that information related to an already-submitted print job, including the print settings data 102 and the image properties data 103, which requires error recovery and/or setting changes.

Figure 13A:
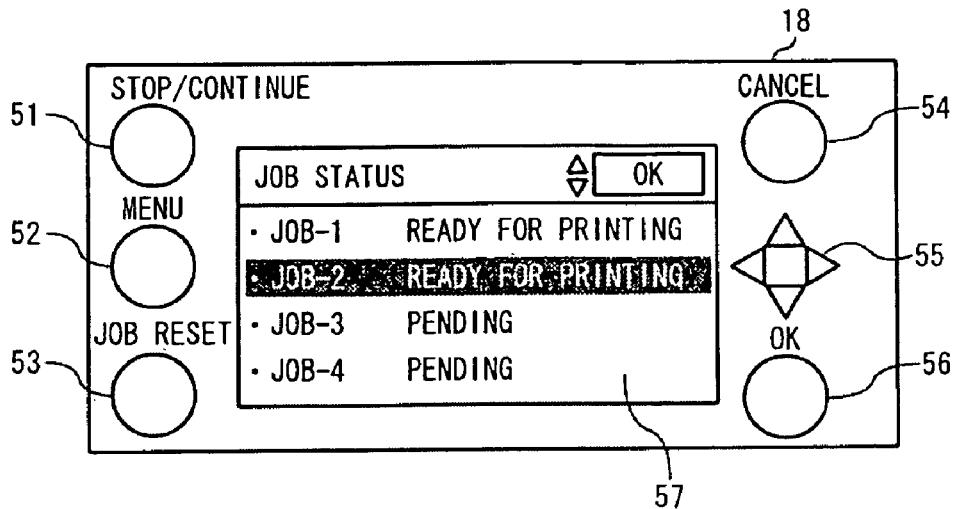
FIGS. 13A and 13B are schematic diagrams illustrating examples of display on the user interface for modification of print settings data.
Figure 13B:
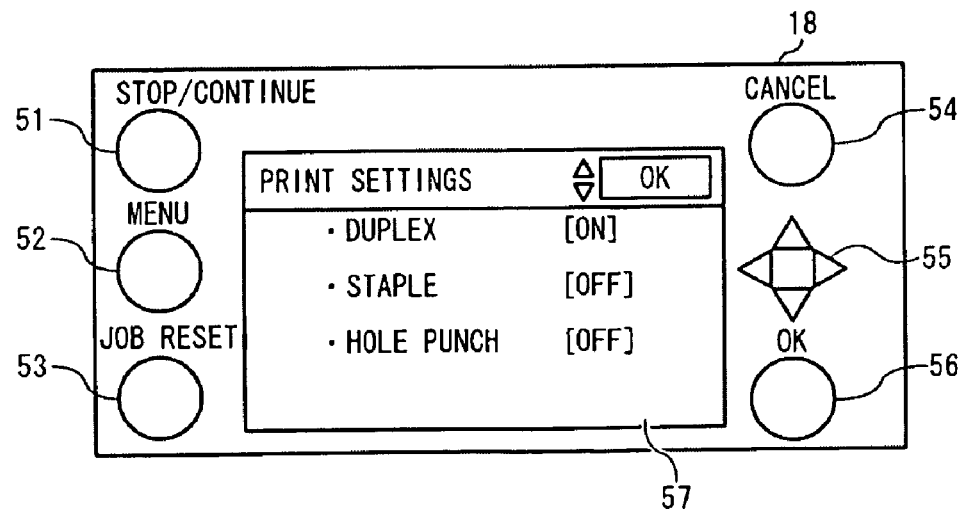

Referring to FIGS. 13A and 13B, schematic diagrams illustrating examples of display on the UI 18 for modification of the print settings data 102 are described.

In response to a given user action during operation, the UI 18 displays a list of pending print jobs on the display panel 57 ("JOB STATUS") as shown in FIG. 13A. The pending job list provides job names ("JOB-1", "JOB-2", "JOB-3", "JOB-4", etc.) with current status information indicating that each job is pending for printing or for image processing ("READY FOR PRINTING", "PENDING", etc.). To modify the print settings data 102, a user may select an item indicated as "READY FOR PRINTING" or as "PENDING" in the pending job list. The selected item is highlighted or displayed with foreground and background colors reversed ("JOB-2, READY FOR PRINTING").

When the user selects a pending job from the pending job list and presses the OK key 56, the UI 18 displays a list of print settings for the selected job ("PRINT SETTINGS") on the display panel 57 as shown in FIG. 13B. The print settings list provides user-modifiable settings for printing defined in the print settings data 102, such as enabling or disabling various finishing functions available on the printing system 1 ("DUPLEX", "STAPLE", and "HOLE PUNCH" each indicated as "ON" or "OFF"), or specifying conditions for printing such as paper size, paper tray, or staple position (not shown). The user may select a particular item on the print settings list to modify the particular print setting using the control keys.

Figure 14A:
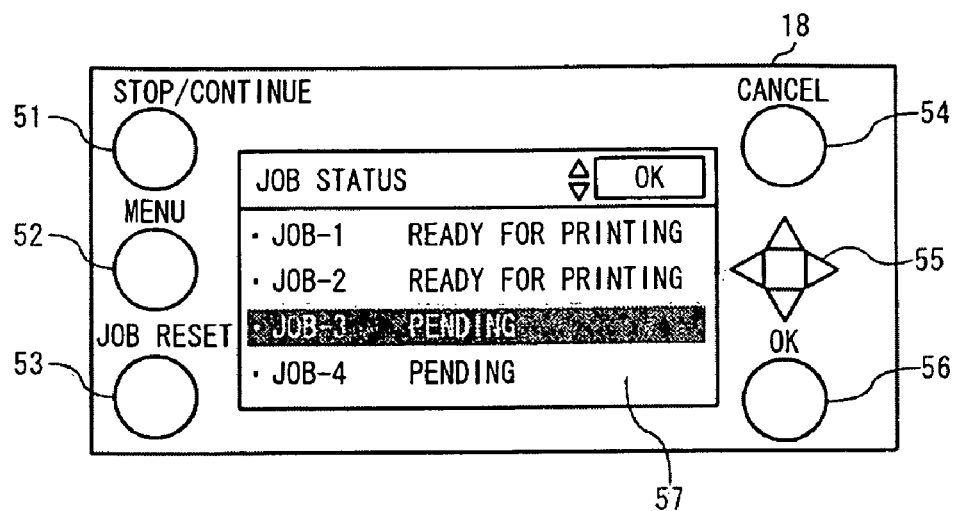
FIGS. 14A and 14B are schematic diagrams illustrating examples of display on the user interface for modification of image properties data.
Figure 14B:
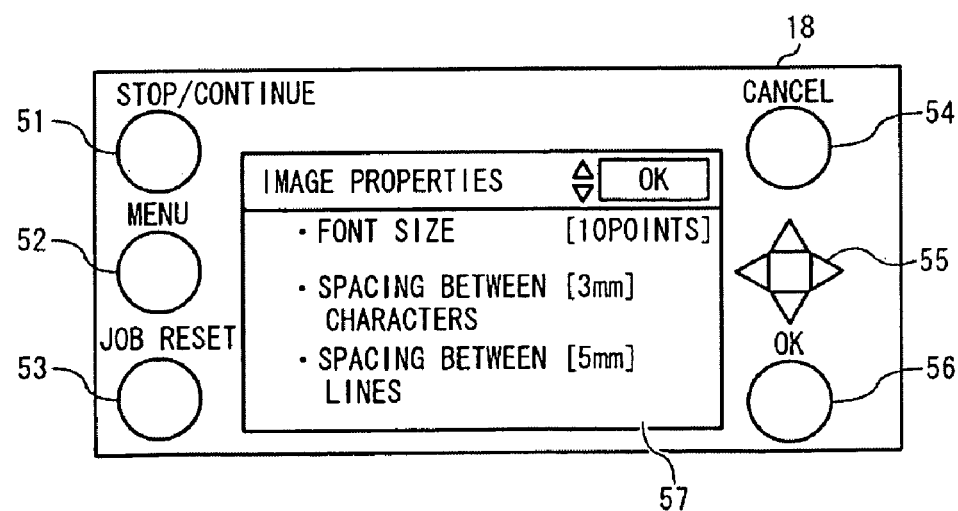

Referring to FIGS. 14A and 14B, schematic diagrams illustrating examples of display on the UI 18 for modification of the image properties data 103 are described.

In response to a given user action during operation, the UI 18 displays a list of pending print jobs on the display panel 57 ("JOB STATUS") as shown in FIG. 14A. To modify the image properties data 103, a user may select an item indicated as "PENDING" in the pending job list. The selected item is highlighted or displayed with foreground and background colors reversed ("JOB-3, PENDING").

When the user selects a pending job from the pending job list and presses the OK key 56, the UI 18 displays a list of image properties for the selected job ("IMAGE PROPERTIES") on the display panel 57 as shown in FIG. 14B. The image properties list provides user-modifiable properties of image data defined in the image properties data 103, such as font size and spacing between characters and/or lines supported by the printing system 1, ("FONT SIZE", "SPACING BETWEEN CHARACTERS", and "SPACING BETWEEN LINES" each defined as "10 POINTS", "3 mm", and "5 mm"). The user may select a particular item on the image properties list to modify the particular image property using the control keys.

As noted above, the suspension capabilities of the printing system 1 are available in either of the first and second suspend modes M1 and M2. In employing the job-modification capability during operation, the first and second suspend modes M1 and M2 may be selectively used depending on the type of data to be modified. The suspend mode may be set before operation, or may be specified by the user during operation.

Figure 15:
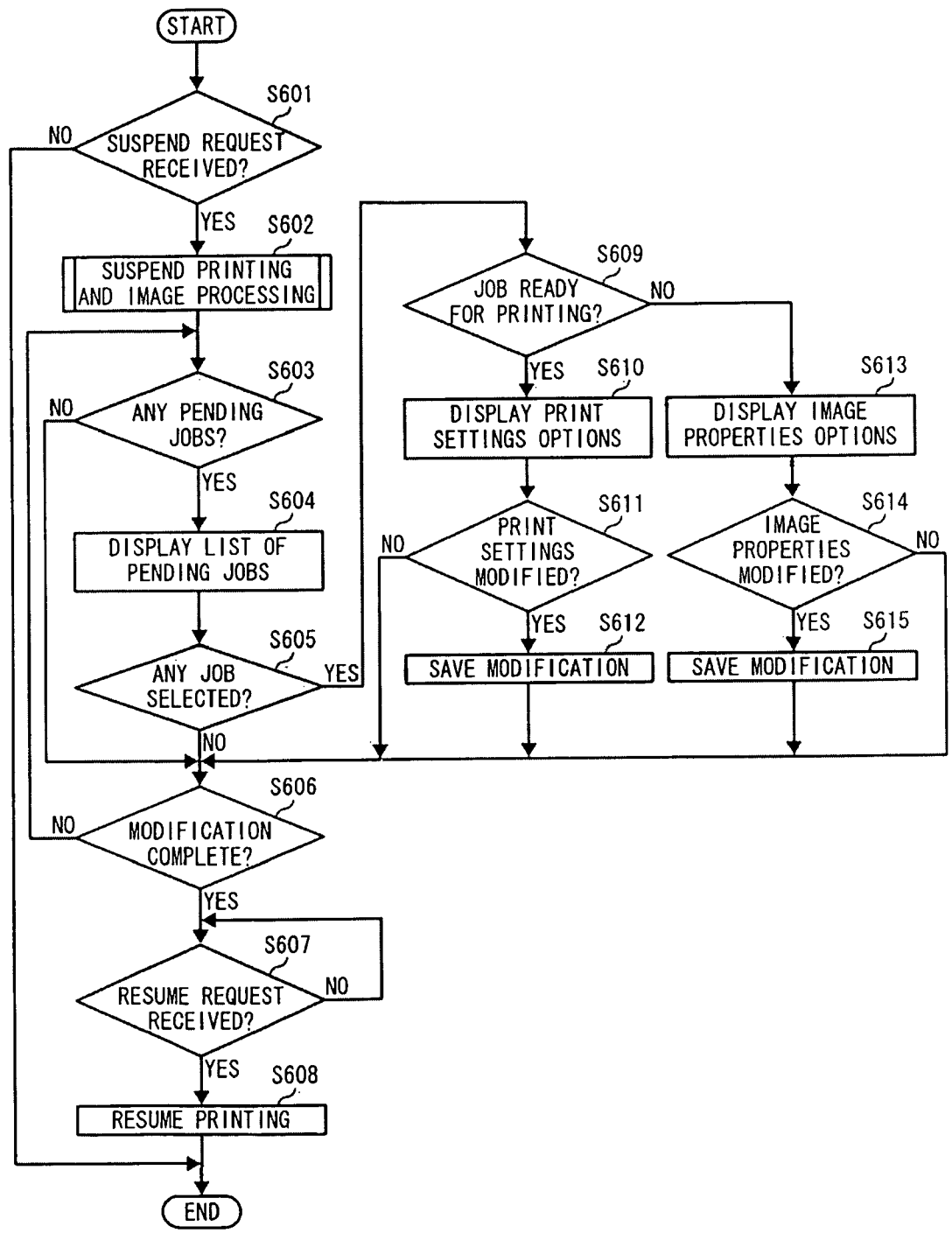
FIG. 15 is a flowchart illustrating an example of operation of the printing system of FIG. 1 provided with a job-modification capability.

Referring to FIG. 15, a flowchart illustrating operation of the printing system 1 with the job-modification capability is described, in a configuration where the suspension is performed using the second suspend mode M2.

Upon receiving a suspend request during operation in a non-suspended state ("YES" in S601), the printing system 1 suspends both printing and image processing (S602). Then, the system manager 11 determines whether or not there are any pending print jobs.

When one or more print jobs remain pending ("YES" in S603), the UI controller 14 displays a list of pending jobs on the UI 18 (S604). When a user selects one from the pending job list (S605), the system manager 11 determines whether the selected job is pending before image processing or before printing (S609).

When the selected job is pending before, i.e., ready for, printing, the UI controller 14 displays a list of modifiable print settings on the UI 18 (S610). When the user modifies a print setting ("YES" in step S611), the system manager 11 saves the modification and stores the modified print settings data 102 in the memory 16 (S612).

When the selected job is pending before image processing, the UI controller 14 displays a list of modifiable image properties on the UI 18 (S613). When the user modifies an image property ("YES" in step S614), the system manager 11 saves the modification and stores the modified image properties data 103 in the memory 16 (S615).

When no print job remains pending or is selected for modification, or after a particular job is selected for modification, the system manager 11 inquires whether or not to select a print job for modification.

When the user continues modification ("NO" in S606), the process returns to step S603. When modification is completed ("YES" in S606), the printing system 1 waits for a resume request.

Upon receiving a resume request ("Y" in S607) or upon determining that a given time period has elapsed since suspension (not shown), the printing system 1 resumes printing and image processing (S608).

Figure 16:
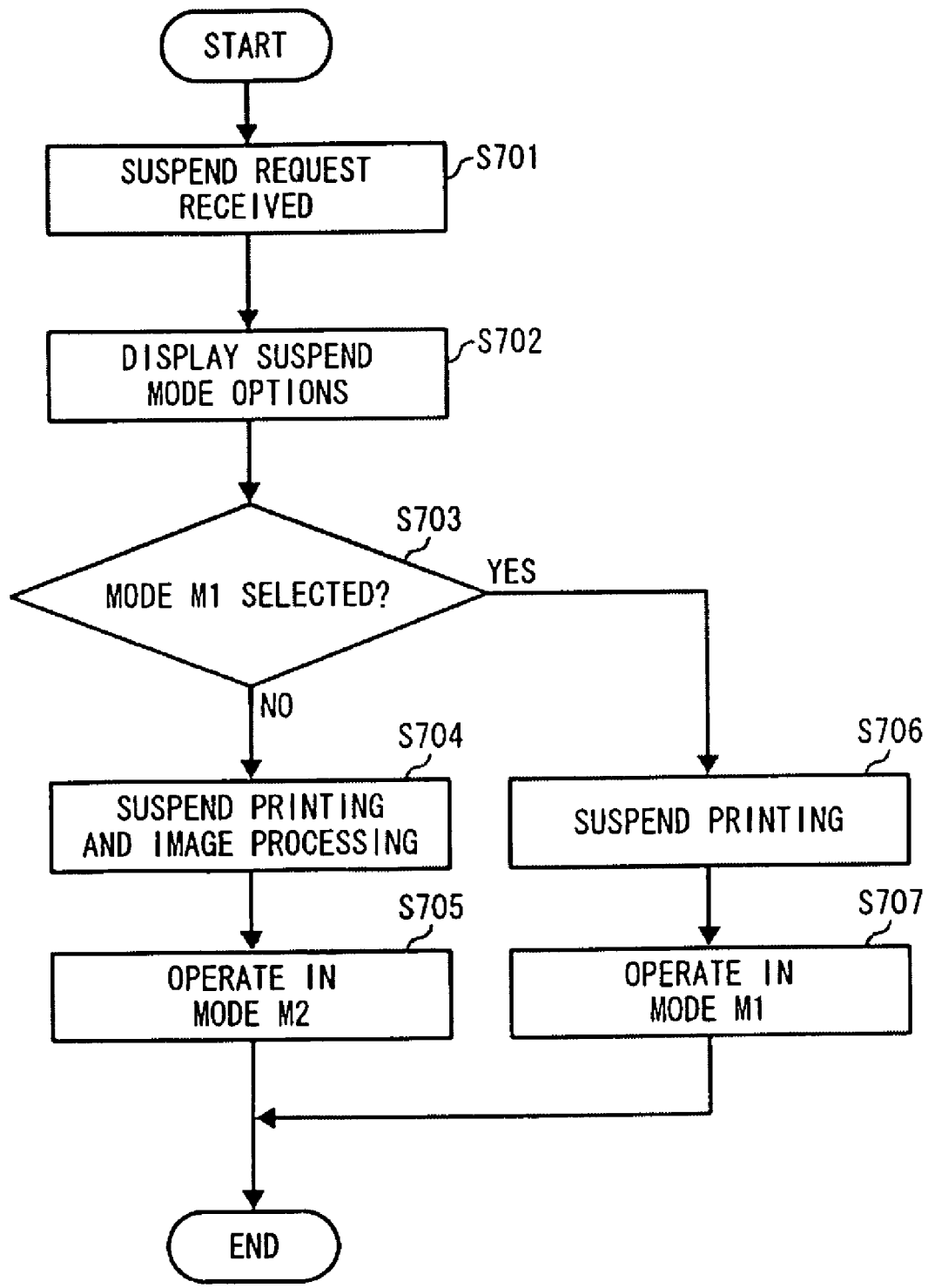
FIG. 16 is a flowchart illustrating another example of operation of the printing system 1 with the job-modification capability.

Referring to FIG. 16, a flowchart illustrating operation of the printing system 1 with the job-modification capability is described, in a configuration wherein the suspension is performed using a selected one of the first and second suspend modes M1 and M2.

Upon receiving a suspend request during operation in a non-suspended state (S701), the UI controller 14 displays suspend mode options available for user selection on the UI 18 (S702).

When a user selects the first suspend mode M1 ("YES" in S703), the printing system 1 suspends printing (S706) and operates in the first suspend mode M1 (S707), so that the user may modify the print settings data 102 in a manner similar to that illustrated in S610 through S612 of FIG. 15.

When a user selects the second suspend mode M2 ("NO" in S703), the printing system 1 suspends printing and image processing (S704) and operates in the second suspend mode M2, so that the user may modify the print settings data 102 and/or the image properties data 103 in a manner similar to that illustrated in S610 through S615 of FIG. 15.

In the embodiment as illustrated in FIG. 16, the suspend mode may be specified by the number of times the CONTINUE/STOP key 51 is pressed. For example, when a user submits a suspend request using the CONTINUE/STOP key 51, pressing only once the CONTINUE/STOP key 51 specifies the first suspend mode M1, and pressing twice the CONTINUE/STOP key 51 specifies the second suspend mode M2.

As can be appreciated by those skilled in the art, numerous additional modifications and variations are possible in light of the above teachings. It is therefore to be understood that, within the scope of the appended claims, the disclosure of this present invention may be practiced otherwise than as specifically described herein.

Further, elements and/or features of different exemplary embodiments may be combined with each other and/or substituted for each other within the scope of this disclosure and appended claims.

Still further, any one of the above-described and other example features of the present invention may be embodied in the form of an apparatus, method, system, computer program and computer program product. For example, the aforementioned methods may be embodied in the form of a system or device, including, but not limited to, any of the structure for performing the methodology illustrated in the drawings.

Even further, any of the aforementioned methods may be embodied in the form of a program, written in an object-oriented or legacy programming language, such as C, C++, or Java. The program may be stored on a computer readable medium and is adapted to perform any one of the aforementioned methods when run on a computer device (a device including a processor). Thus, the storage medium or computer readable medium is adapted to store information and is adapted to interact with a data processing facility or computer device to perform the method of any of the above mentioned embodiments.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A printing control system, comprising:
a host interface configured to communicate with a host device, the host device submitting a print job;
a user interface;
a printing unit configured to execute a print job submitted by the host device, the printing unit operable according to print settings and image properties; and
a controller configured to suspend operation at the printing unit including printing and image processing in response to a suspend request received at one of the host interface and user interface, to measure an elapsed time since a suspension of operation, and to transmit one of first and second commands upon determining that the elapsed time exceeds a given reference time,
the first command causing the printing unit to automatically resume a suspended operation,
the second command causing the host interface to send a notification of the suspension,
wherein the print settings of the printing unit and image properties of a selected pending print job are modifiable using at least one of the host interface and user interface, while the printing and image processing are suspended,
wherein the controller selectively suspends operation at the printing unit in a first suspend mode in which only printing is suspended, and
wherein the controller selectively suspends operation at the printing unit in a second suspend mode in which both printing and image processing are suspended.

2. The printing control system according to claim 1, wherein the host interface sends the notification to a specified recipient,
the recipient including at least one of the host device and an administrator of the printing system.

3. The printing control system according to claim 1, wherein the given reference time is specified through one of the host interface and user interface.

4. The printing control system according to claim 1, wherein the host interface indicates, during a given time period after the suspension, an expected amount of time remaining before the elapsed time exceeds the given reference time.

5. The printing control system according to claim 4, wherein the given time period is specified through one of the host interface and user interface.

6. The printing control system according to claim 1, wherein the controller selectively suspends image processing at the printing unit in response to the suspend request.

7. A printing control method, comprising:
receiving a print job from a host device;
initiating a printing unit to process the print job;
after initiation of the printing unit, suspending operation of the printing unit including printing and image processing, in response to a suspend request;
selecting a print job;
modifying print settings, and modifying image properties of the print job which has been selected, while operation of the printing unit is suspended, the operation of the printing unit being selectively suspended in a first suspend mode in which only printing is suspended, and the operation of the printing unit being selectively suspended in a second suspend mode in which both printing and image processing are suspended;
measuring an elapsed time since a suspension of operation; and
upon determining that the elapsed time exceeds a given reference time, performing one of:
causing the printing unit to automatically resume a suspended operation; and
sending a notification of the suspension.

8. The method according to claim 7, wherein the notification is sent to a specified recipient,
including at least one of the host device and an administrator of the printing system.

9. The method according to claim 7, further comprising setting the given reference time as specified by a user.

10. The method according to claim 7, further comprising indicating, during a given time period after the suspension, an expected amount of time remaining before the elapsed time exceeds the given reference time.

11. The method according to claim 10, wherein the given time period is user-specifiable.

12. The method according to claim 7, wherein the suspending includes selectively suspending image processing in response to the suspend request.

* * * * *